June 1, 1954
N. ANTON
2,680,187
SOLDERING GUN
Filed April 29, 1952
2 Sheets-Sheet 2
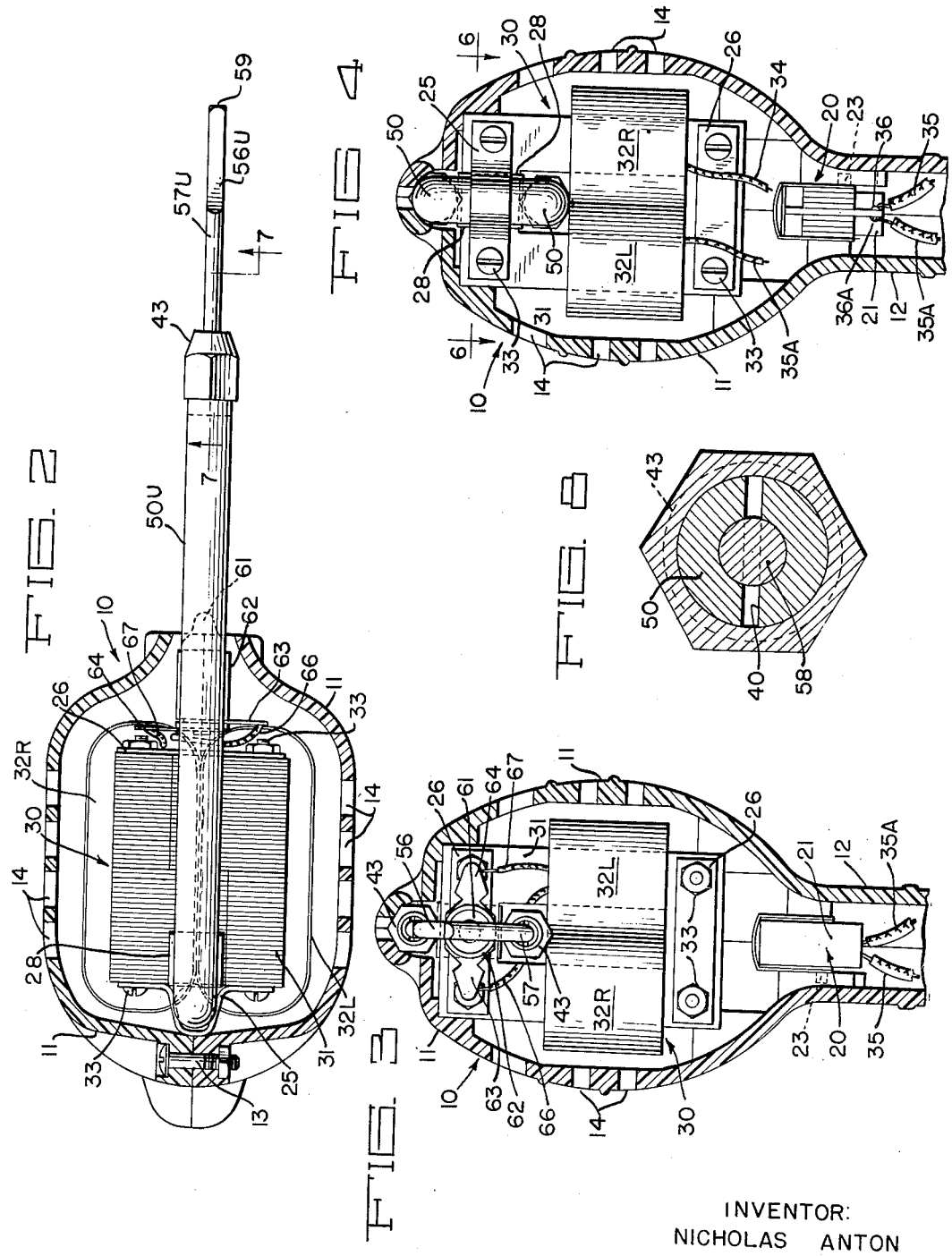
INVENTOR:
NICHOLAS ANTON
BY:
*Wallace and Cannon*
ATTORNEYS:

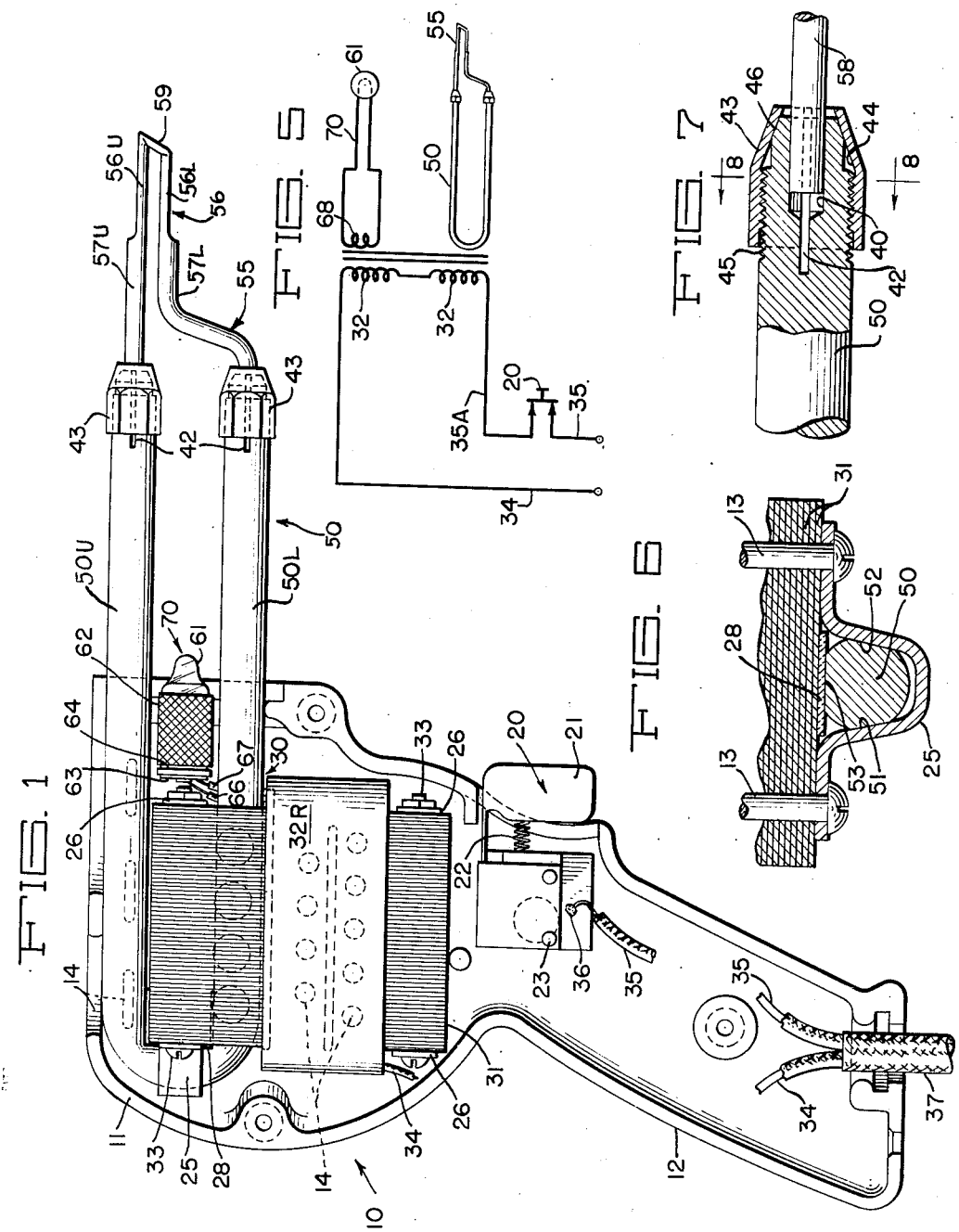

Patented June 1, 1954

2,680,187

UNITED STATES PATENT OFFICE 2,680,187

SOLDERING GUN

Nicholas Anton, Park Ridge, Ill.

Application April 29, 1952, Serial No. 284,990

7 Claims. (Cl. 219—26)

This invention relates to soldering tools and more particularly to that type in which the soldering iron is electrically heated and the tool in general assumes the configuration of a pistol.

It is an object of the present invention to afford a soldering iron which is adapted to be heated by means of a resistance element electrically identical with the secondary winding of a step-down transformer, the resistance element being characterized by its ability to attain an operative condition of heat content within a matter of seconds as the result of a novel configuration thereof. A further object of the present invention is to connect the resistance element to the secondary coil or winding in a manner so as to assure an effective electrical contact therebetween as well as a type of connection that assures maintenance of the resistance element in a rigid condition of mounting. A related object of the present invention is to assure that the secondary coil remains rigidly mounted relative to the transformer.

In soldering tools of the above type, heat is developed quite rapidly and in relatively large amounts, and it is a further object of the present invention to confine the heat thus developed to the work element as much as possible, and especially to prevent over-heating of the transformer core during use. Further objects are to permit soldering to be done in a more expeditious and facile manner and to reduce power requirements to a minimum.

Other objects will be apparent from the description to follow as well as from the drawings wherein:

Fig. 1 is a side elevation of the soldering iron with a section of the handle removed to expose internal parts;

Fig. 2 is a top plan view of the soldering iron showing the handle in horizontal section;

Fig. 3 is a front elevation of the soldering iron showing the handle in vertical section;

Fig. 4 is a rear elevation of the soldering iron showing the handle in vertical section;

Fig. 5 is a wiring diagram indicating the manner in which the soldering iron is heated;

Fig. 6 is a sectional view taken substantially along the lines 6—6 of Fig. 4, certain parts being shown as broken away;

Fig. 7 is a sectional view taken substantially along the line 7—7 of Fig. 2, certain parts being broken away; and Fig. 8 is a sectional view taken substantially along the line 8—8 of Fig. 7.

For purposes of disclosure, the present invention is shown in Figs. 1-8 as embodied in the form of a soldering tool, or gun, generally indicated at 10, which comprises a casing and handle assembly 11—12 of a light thermosetting plastic and consisting of two complementary half sections joined together by threaded bolts as 13. The handle portion 12 receives a conductor cord 37, Fig. 1, and also mounts a trigger switch generally indicated at 20. The casing portion 11 houses a step-down transformer generally indicated at 30, the secondary coil or field winding of which consists of a U-shaped conductor 50 to which a resistance element, generally indicated at 55, is electrically connected. The members 50 and 55 are interconnected in a manner to be described below and together constitute the iron, or work part, of the soldering tool.

The transformer 30 comprises a laminated rectangular iron core 31 of a known type, and the primary coil 32, which consists of several hundred turns of small-diameter copper wire, is wrapped about either side of the core as best indicated in Fig. 2. The casing 11, as shown in Fig. 1, is shaped internally so as to present shoulders and cavities that conform generally to the configuration of the transformer so that the latter is firmly retained and closely enfolded when in position. The primary coil is adapted to use a 110-120 volt alternating current, for instance, carried by leads 34 and 35 of the conductor cord 37. As shown in Fig. 5, the transformer 30 is adapted to induce two fields, one for the resistance element 55 and one for a spotlight generally indicated at 70, Fig. 1.

Switch 20 is of a known type in that it is adapted to automatically disable itself when the force initially required to actuate the switch is released from the trigger 21, and may be mounted in the handle 12 by means of pins 23 of a size to fit into mounting sleeves (not shown) formed interiorly the handle 12. Thus, the transformer 30 and switch 20 are freely removable as a body when the casing and handle assembly 11—12 is separated by removing the retaining bolts 13. In this regard, it may be noted that the casing 11 is formed with a plurality of ventilating apertures as 14 for dissipating heat generated during the use of the tool. The free end of the lead 35 is connected to a contact 36 of the switch 20. Another lead 35A, Figs. 3 and 4, electrically identical to the lead 35, is connected to another contact 36A of the switch 20 that corresponds to the contact 36, and is connected to the left member 32L of the coil 32 as shown in Fig. 4. On the other hand, lead 34 is directly connected to the right-hand member 32R of coil 32 so that when the trigger 21 of the switch 20 is pressed in against the action of a spring 22, leads 35 and 35A are joined in series and coil 32 is thereupon charged with alternating current.

As was noted above, the member 50 represents the secondary coil of the transformer 30 and is in the form of a solid, one piece, U-shaped rod, the loop or bight portion of which embraces the upper rear section of the transformer coil so that the upper and lower legs of the secondary coil 50, 50U and 50L respectively, extend in a forward direction parallel to the top of the transformer core. A bracket or strap 25 positions the member 50 relative to the transformer core, this bracket being held in place by the same bolts 33 which are adapted to draw the laminae of the core 31 together. Bracket 25 and a bracket 26 are mounted on the retaining bolts 33 next to the rearward-most and forward-most laminae 31, respectively, of the transformer 30, Fig. 2, thus to assure that the laminae 31 may be drawn tightly together. As shown in Figs. 1 and 2, the upper and lower legs of the secondary coil 50 lie in a vertical plane, and the maintenance of this relationship is assured by flattening the sides 51 and 52 of coil 50 that are engaged by the channelled retaining bracket 25 as shown in Fig. 6, and similarly flattening the inner side 52 of member 50 corresponding to the rearward upper portion of the transformer core 31. The flattened portion 53 is adapted to bear against a right angle insulating plate 28 that overlaps the upper rearward corner of the transformer core 31. It will be seen that plate 28, as shown in Figs. 1 and 6, maintains the coil 50 in spaced relationship to the core of the transformer, and such insulation, together with the openings 14 in the casing, prevents overheating of the transformer core and permits a prolonged period of use.

The resistance element 55 constitutes the primary working part of the soldering iron in that it is this element which is adapted to develop sufficient heat to perform the soldering job, and referring to Fig. 1, it will be observed that this element is in the form of a somewhat tapered, one piece member that is capable of easy insertion into relatively inaccessible spots. Thus, the element 55 is in the form of a loop having legs, 57U and 57L, defining a rearward portion and being spaced apart at their rearward ends a distance corresponding to the legs of coil 50. The lower leg 57L of the element 55 is bent upwardly as shown in Fig. 1 and is extended in the direction of a forward portion 56 of the resistance element 55. The resistance element 55 is shaped so that the forward extension or bight portion 56, including the leg elements 56U and 56L, is of a reduced thickness relative to the rearward extensions 57U and 57L, such configuration assuring a rapid heating of the resistance element 55. That is to say, the thickness of the leg elements 56U and 56L of the forward extension 56 of the resistance element 55 is about one-half of the thickness of the leg elements 57U and 57L of the rearward portion 57 so that current flowing forwardly through the element 55 passes from an area of lesser to one of substantially greater resistance. This increase in resistance results in a relatively large and effective concentration of heat power at the crucial working part.

Since the resistance element 55 may be subjected to rather extreme conditions of use, it is preferable that such element be readily replaceable. Accordingly, axial bores 40, Fig. 7 are provided at either end of the secondary coil 50, such bores being of a diameter slightly greater than the diameter of the terminal ends 58 of the resistance element 55, which ends are, of course, spaced apart a distance corresponding to the spacing between the upper and lower legs of the coil 50. Extending transversely of the bores 40 are slots 42, and the outside end portions of the coil 50 are tapered as at 46 so as to assume a frusto-conical configuration. Thus, it will be seen that the ends of the member 50 are each adapted, when compressed, to grip an end 58 of the resistance element 55 when the latter is mounted in the bores 40 of member 50. This is accomplished by means of nuts 43 which have ends tapered internally at 44 complementary to the tapered ends 46 of the coil 50, and it will be seen that when the nuts 43 are screwed over the ends of the member 50 to such an extent that the tapered portions 44 and 46 engage one another, subsequent turning of the nuts in the direction of the transformer 30 firmly locks the resistance element to the secondary coil so that a high efficiency is attained in transmitting the induced power from the coil 50 to the resistance element 55.

In view of the fact that the soldering tool 10 of the present invention is primarily adapted for close work as manifest in the configuration of the resistance element 55, it is desirable that a means be afforded whereby the job can be illuminated. Accordingly, a lamp in the form of a spotlight 70 is housed in the casing 11 between the legs of coil 50. A bulb 61 is mounted in a socket (not shown) which is provided with a pair of contacts 63 and 64, Fig. 3, in a known manner, the socket being sheathed in an insulating sleeve 62. Lead-ins 66 and 67, constituting the ends of another secondary coil 68, are connected to the contacts 63 and 64 respectively. Accordingly, when the switch 20 is closed, lamp 70 is illuminated as the result of another induced voltage, this time in the coil 68.

Referring to Fig. 1, it will be observed that the tip 59 on the forward extension 56 of the resistance element 55 is inclined at an angle of approximately 40° to 70° to the horizontal, such angle being illustrated as substantially 62° in the drawings. By and large, most soldering is done from a standing position with the particular job horizontally supported, so that if the tip 59 were at right angles to the horizontal as viewed from the position of Fig. 1, the operator would have to bend his wrist to an abnormal position. Also, by thus inclining the tip 59, small parts such as crevices and the like, or small angles between adjacent parts are made more accessible in relation to the tool. Moreover, it will be observed from the drawings that the working surface of the tip portion 59 is flattened, thus presenting a relatively large surface area from which heat is adapted to be conducted during use of the tool.

In use, and assuming a source of alternating current in the conductor 37, trigger 21 of switch 20 is pressed in and the circuit to the primary windings of the transformer is completed. The alternations of the primary current in the coil 32 set up an alternating flux in the core constituted by the laminae 31, and the continual build up and collapse of this flux induces a voltage in the secondary coil 50. Being of large diameter the coil 50 offers little resistance to the flow of current therethrough and consequently little heat is developed; however, as the current flows into the rearward or enlarged portion 57 of the element 55, the resistance increases as will be clear from the fact that the diameter of portion 57 is substantially 0.4 that of the coil 50. Resistance undergoes a further increase in the forward portion or extension 56 of the element 55 so that an operative condition of heat content in the tool 10 is attained almost instantaneously. It will be appreciated that such characteristics decrease the period of high power demands since the power demand will decrease with increasing heat content in the resistance element 55 by virtue of increasing resistance.

While heat is developed quite rapidly in the resistance element 55, such is not true for the coil 50 since the larger cross section of material in coil 50 can better carry the power without overheating. Thus, the only practical amount of heat developed in the coil 50 is that which it receives by conduction from the element 55, and this heat can be transferred to the core of the transformer only by radiation as the result of spacing the coil 50 therefrom as was noted above. It will, therefore, be seen that the present invention is economical in use, highly efficient from a standpoint of ability to heat, generates a greater amount of heat in a given time period, and reduces fatigue.

While I have specified and shown one embodiment of the present invention, it will be appreciated that changes and modifications can be made as desired or needed without departing from the scope of practice of the concepts of the present invention. I intend, therefore, to be limited only by the following claims, which claims represent manifestations of practice of the present inventive concepts, distinguishing the same from others in the field.

I claim:

1. A soldering tool comprising, a step-down transformer including primary and secondary windings, said secondary winding including an elongated reversely-bent work-engaging element, said work engaging element having a rearwardly disposed open end portion and a forwardly disposed closed end portion, said open end portion and said closed end portion each comprising two spaced elongated legs, said legs of said closed end portion being joined at their outer ends by a work-engaging tip portion disposed in the same longitudinal plane therewith and being of substantially uniform cross-section throughout their length and being of lesser cross-section than the legs of said open end portion throughout their entire axial extent rearwardly of said work-engaging tip portion.

2. A soldering tool comprising, a step-down transformer including primary and secondary windings, said secondary winding including an elongated reversely-bent work-engaging element, said work engaging element having an open end portion and a closed end portion projecting forwardly from said open end portion, each of said end portions including two spaced elongated legs, said closed end portion including an intermediate leg interconnecting the forward ends of said two legs of said closed end portion and having a substantially flat forwardly disposed face, said two legs of said closed end portion being of substantially uniform cross-section throughout their lengths, said third leg being disposed at an acute angle of not substantially less than 40 degrees and not substantially more than 70 degrees to said last mentioned two legs and being shorter in length than said last mentioned two legs, and said two legs and said intermediate leg of said closed end portion being smaller in cross-section than said legs of said open end portion.

3. A soldering tool comprising a step-down transformer including primary and secondary windings, said secondary winding comprising two elongated leads projecting forwardly from said primary windings in spaced relation to each other, and an elongated work engaging member having two elongated legs disposed in spaced relation to each other, and an elongated third leg extending between and electrically interconnecting two ends of said two legs, said third leg being shorter in length than said two legs, the other end of each of said two legs being mounted on and electrically connected to a respective one of said leads, said two legs and said third leg being smaller in cross-section than said leads, said first mentioned ends of said two legs being disposed in substantially parallel relation to each other and being smaller in cross-section than said other ends of said two legs.

4. A soldering tool comprising a casing, a step-down transformer mounted in said casing and comprising a core, said primary and secondary windings, said secondary winding comprising an elongated substantially U-shaped member disposed around a portion of said core, said member including two substantially parallel legs projecting forwardly from said core in substantially parallel spaced relation to each other, and an elongated reversely-bent work-engaging member having a closed end portion and an open end portion, said closed end portion being narrower in width than said open end portion and comprising two substantially parallel elongated legs and a third leg interconnecting one end of said two legs, said open end portion comprising two spaced legs, each of said last mentioned legs being electrically connected to and extending rearwardly from the other end of a respective one of said two legs of said closed-end portion, each of said two legs of said open end portion being electrically connected to and projecting forwardly from a respective one of said legs of said U-shaped member, said two legs and said third leg of said closed end portion being smaller in cross-section than said legs of said open end portion.

5. A soldering tool comprising a casing, a step-down transformer mounted in said casing and comprising a core, and primary and secondary windings, said secondary winding comprising an elongated substantially U-shaped member disposed around a portion of said core, said member including two substantially parallel legs projecting forwardly from said core in substantially parallel spaced relation to each other, and an elongated reversely-bent work-engaging member having a closed end portion and an open end portion, said closed end portion being narrower in width than said open end portion and comprising two substantially parallel elongated legs and a third elongated leg interconnecting one end of said two legs, said open end portion comprising two spaced legs, each of said last mentioned legs being electrically connected to and extending rearwardly from the other end of a respective one of said two legs of said closed-end portion, each of said two legs of said open end portion being electrically connected to and projecting forwardly from a respective one of said legs of said U-shaped member, said two legs and said third leg of said closed end portion each being of substantially uniform cross-section throughout its length and each being smaller in cross-section than said legs of said open end portion.

6. A soldering tool comprising a casing having a handle portion for manually supporting the same, a step-down transformer mounted in said casing and including primary and secondary windings, said secondary winding comprising two leads projecting from said casing in spaced relation to each other, and a work-engaging member mounted on said leads and electrically interconnecting the latter, said work-engaging member having an open-end portion and a closed-end portion, said open end portion comprising two elongated legs disposed in spaced relation to each other, each of said legs having one end portion removably mounted in a respective one of said leads and another end portion projecting away from said lead, said closed end portion being narrower in width than said open end portion and comprising two elongated legs and a third leg, said last mentioned two legs being disposed in substantially parallel relation to each other and each having one end portion integrally attached to said other end portion of a respective one of said first mentioned two legs and each having another end portion, said third leg being disposed between said other end portions of said two legs of said closed end portion at an acute angle of not substantially less than 40 degrees and not substantially more than 70 degrees thereto and interconnecting said last mentioned other end portions, said two legs and said third leg of said closed end portion being smaller in cross-section than said first mentioned two legs and said leads.

7. A soldering tool comprising a step-down transformer, said transformer comprising a core, and primary and secondary windings, said secondary winding comprising a substantially U-shaped member having a closed end portion and two substantially parallel spaced legs projecting forwardly from said closed end portion, said member being disposed around a portion of said core with said legs and said closed end portion disposed in spaced relation to said core, means for mounting said member in said spaced relation to said core, said means comprising an insulating member mounted between said closed end portion and said core, and clamping means mounted on said closed end portion and said core, and an elongated reversely bent work-engaging member mounted on said legs, said work-engaging member having an open end portion mounted on said legs and a closed end portion projecting forwardly from said open end portion, said closed end portion being of substantially uniform width throughout its length and being narrower in width than said open end portion, said reversely bent work-engaging member being narrower in cross-section in said closed end portion than in said open end portion.

References Cited in the file of this patent

UNITED STATES PATENTS

| Number | Name | Date |
|---|---|---|
| 2,359,393 | Sloan | Oct. 3, 1944 |
| 2,405,866 | Weller | Aug. 13, 1946 |
| 2,491,931 | Raker et al. | Dec. 20, 1949 |
| 2,501,192 | Scholler | Mar. 21, 1950 |
| 2,541,214 | Davis | Feb. 13, 1951 |
| 2,560,552 | Caliri | July 17, 1951 |
| 2,570,762 | Caliri | Oct. 9, 1951 |

FOREIGN PATENTS

| Number | Country | Date |
|---|---|---|
| 838,748 | France | Dec. 16, 1938 |
| 969,454 | France | May 24, 1950 |

OTHER REFERENCES

American Machinist, June 26, 1950, page 141.